Jewett & Everson,
Shoe-Sole Machine,
N° 55,664. Patented June 19, 1866.

Witnesses
M. W. Frothingham
S. B. Kidder.

Inventors
N. B. Jewett &
E. Everson
By their Attys

UNITED STATES PATENT OFFICE.

N. B. JEWETT AND E. EVERSON, OF HAVERHILL, MASSACHUSETTS.

MACHINE FOR FACING BOOT AND SHOE BOTTOMS.

Specification forming part of Letters Patent No. 55,664, dated June 19, 1866.

*To all whom it may concern:*

Be it known that we, N. B. JEWETT and E. EVERSON, both of Haverhill, in the county of Essex and State of Massachusetts, have invented a new and useful Improvement in Machines for Facing Boot and Shoe Bottoms; and we do hereby declare that the following, taken in connection with the drawings which accompany and form part of this specification, is a description of our invention sufficient to enable those skilled in the art to practice it.

In facing the bottoms of boots and shoes so as to remove therefrom marks, stains, peg ends, &c., and produce a smooth finished surface, a rotating cylinder is employed, which is covered with sand-paper or other equivalent cutting material. This operation generates great quantities of dust, which it is an object to remove by mechanical means, so as not to incommode or impair the health of the workmen or settle in the work-room. This object has heretofore been accomplished, but by means requiring so much expenditure of force that they could be operated only in large factories provided with steam, water, or horse power.

To reduce the consumption of power required by the means heretofore employed to remove the dust generated by this grinding or facing operation, and to enable manufacturers on a small scale to work with a foot-treadle a machine capable of removing the dust generated, is the object of our invention. This consists in the peculiar arrangement and combination of the devices herein shown and described, by which the amount of machinery, and consequently the amount of friction and resistance, is reduced to a minimum.

The nature of the invention will be understood upon a description of the drawings illustrating an apparatus embodying it, of which—

Figure 1:
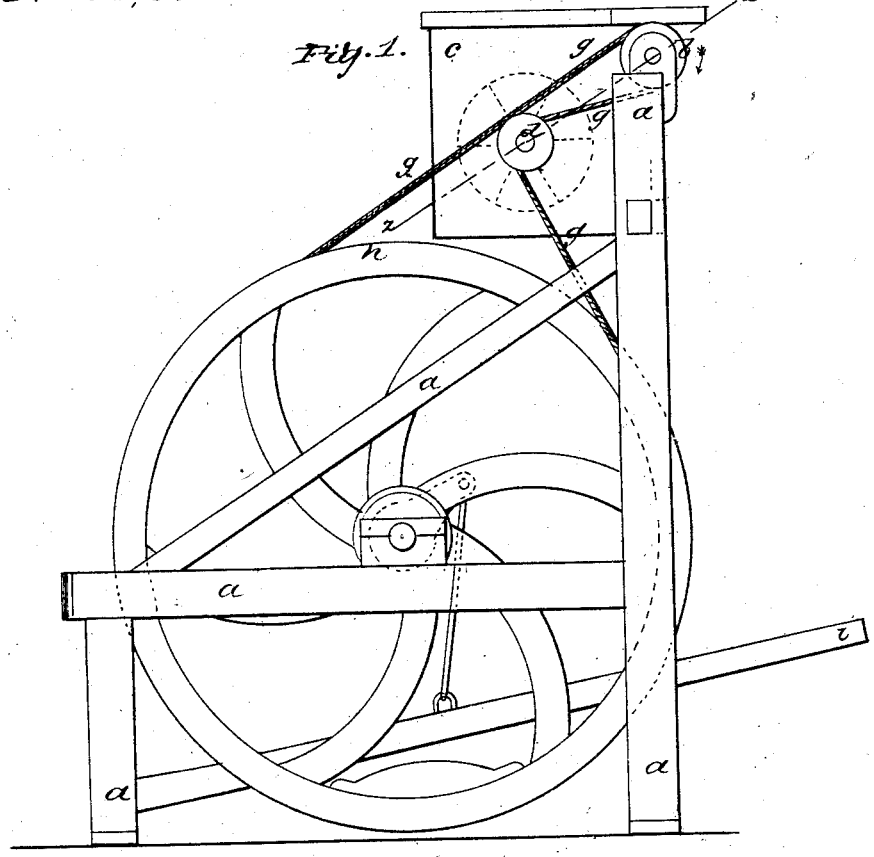
Figure 2:
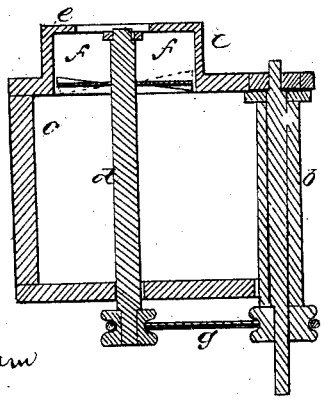

Figure 1 is a side elevation; and Fig. 2 is a section on the line $x\,x$, seen in Fig. 1.

$a$ is the frame-work supporting at a convenient height the grinding-cylinder $b$, which is mounted on suitable bearings in a box, $c$, open at the front for the admission of air. Boots and shoes are presented to the action of the lower side of the cylinder $b$, the faces of the soles being uppermost and the cylinder rotating as indicated by arrows. Passing through said box $c$, parallel with cylinder $b$, is a shaft, $d$, on one end of which, in a case, $e$, opening out of case $c$, is a wind-wheel, $f$, made with blades set angularly to its shaft, somewhat in the manner of a screw-propeller wheel. The operation of this wheel $f$ is to draw the air into box $c$ at the opening in its front, taking it mingled with the dust which is thrown from the grinding-cylinder by the inner edges of the blades, and delivering it at the outer side of the wheel from the opposite edges of the blades into any convenient funnel or chute leading from the room where the machine is located. The action of this fan-wheel is partly centrifugal and partly that of a screw, and works with little resistence. On the shaft of cylinder $b$ and on shaft $d$ are grooved pulleys, over which the belt $g$ from the fly-wheel $h$ passes, the same belt rotating both the grinding-cylinder and the fan, the fly-wheel being rotated from action on the treadle $i$.

We claim—

When combined and arranged as described, and so as to operate in the manner and for the purpose specified, the shaft $d$, grinding-cylinder $b$, (these being parallel with each other and operated from wheel $h$ by one belt, $g$,) the cases $c$ and $e$, and the angular fan-blades $f$.

N. B. JEWETT.
EPHRAIM EVERSON.

Witnesses:
EDWARD GORDON,
ROBERT W. STEVENS.